United States Patent [19]

Thumudo, Jr.

[11] 3,863,001
[45] Jan. 28, 1975

[54] EXTRUSION METHOD FOR EQUALIZING FRICTIONAL MATERIAL DRAG

[76] Inventor: Mario F. Thumudo, Jr., R.R. 1 Box 252, La Fontaine, Ind. 46540

[22] Filed: Jan. 21, 1974

[21] Appl. No.: 435,059

Related U.S. Application Data

[62] Division of Ser. No. 295,310, Oct. 5, 1972, abandoned.

[52] U.S. Cl................. 264/148, 264/176, 425/197
[51] Int. Cl........................... B29f 3/02, B29c 17/14
[58] Field of Search............ 425/197, 461; 264/148, 264/177, 176

[56] References Cited
UNITED STATES PATENTS

| | | | |
|---|---|---|---|
| 3,381,072 | 4/1968 | Mutton et al. | 425/197 X |
| 3,516,478 | 6/1970 | Dunn et al. | 425/197 X |
| 3,542,104 | 11/1970 | Anderson | 425/197 X |
| 3,713,762 | 1/1973 | Oisuger | 425/461 X |

FOREIGN PATENTS OR APPLICATIONS

| | | | |
|---|---|---|---|
| 1,250,840 | 12/1960 | France | 425/197 |

Primary Examiner—Robert L. Spicer, Jr.

[57] ABSTRACT

A method and apparatus is provided for use in the extrusion of flat circular polymeric preforms to be subsequently transfer molded. As part of the apparatus, an improved breaker plate is provided having oppositely disposed surfaces which are closer together near the periphery of the plate than they are near the center of the plate. The plate has orifices extending therethrough over a major portion of the surface area of the plate and because of the configuration of the oppositely disposed surfaces, the orifices nearer the center of the plate are longer than those nearer the periphery, with the result that the flow of material at the center is subjected to frictional drag, compensating for the frictional drag exerted by the surface of the extruder die, and equalizing the speed of flow of extrudate throughout the die. The extrudate is subsequently cut into cylindrical preforms which are flat rather than concave, as are the performs made without the improved breaker plate.

2 Claims, 6 Drawing Figures

EXTRUSION METHOD FOR EQUALIZING FRICTIONAL MATERIAL DRAG

This is a division, of application Ser. No. 295,310, now abandoned, filed Oct. 5, 1972.

BACKGROUND OF THE INVENTION

This invention relates generally to the extrusion of flat cylindrical polymeric preforms, and more particularly to an improved method for extruding such preforms, and the breaker plate used therein.

Polymeric preforms are extruded as the first step in making many products which are subsequently transfer molded into circular or cup-shaped parts, such as wheel cylinder brake cups. It is desirable to make a preform which conforms as nearly as possible to the configuration and weight of the part which is to be molded, to minimize the "flash," which is scrap material. Typically, transfer preforms, or "preps," have been made in either of two ways. In one method of making preforms the polymer is extruded through a circular die and cut into thin circular preps by a rotating cutting blade. The frictional drag exerted by the surface of the extruder die, downstream from the conventional breaker plate, causes the extrudate near the surface of the die to flow slower than that near the center of the die, with the result that the preform is concave rather than flat. It was found that not only was the concave prep harder to handle, store and even load into the mold, but also it had to be larger and heavier than a flat prep would have to be in order that the concave prep would fill out all the mold cavities. This obviously required more material, increasing the material costs for each part made from the concave prep of the prior art.

A more recently used method of forming the preps has been to roll a mill strip, for example, a 6 inch wide strip subsequently cut into 6 inch × 6 inch squares. While this method of making preforms eliminates the problems associated with concave preps, it introduces additional problems caused by the inability to accurately maintain the thickness of the mill strip in a way that would be economically feasible. As a result, it is frequently necessary to load two of the square preps into the transfer mold to insure that the mold cavities will be completely filled. This worsens the problem of overuse of material and greatly increases the material cost per piece, as well as the handling and disposal of scrap material.

Accordingly, it is a primary object of the present invention to provide a method for making flat circular transfer preforms having a configuration which permits subsequent molding with a minimum of scrap.

It has been found that it is possible to produce a flat prep if the extrusion material throughout the entire cross section of the die is flowing at substantially the same speed. It has been further discovered that since the reduced speed of flow near the wall of the die is caused by frictional drag, compensation can be made by the provision of a means for applying an increasing amount of frictional drag to the extrudate toward the center of the die.

Accordingly, it is a further object of the present invention to provide a breaker plate which will equalize the speed of flow of extrudate through the die of a preform extruder.

It is also an object of the present invention to provide a method and apparatus for extruding transfer preforms which will make the use of more expensive polymers for transfer molding economically feasible.

SUMMARY OF THE INVENTION

These and other objects, which will become evident upon reading the following detailed description, are accomplished by the provision of an improved breaker plate in combination with an extruder head, a substantially cylindrical extruder die fixedly located within the head, and a cutting means located downstream from the plate, adjacent the exit end of the die. The improved breaker plate is located on the upstream side of the die and has first and second oppositely disposed surfaces defining a central axis generally perpendicular to the surfaces, which are oriented such that the locus of all points, on either surface, equidistant from the central axis defines a circle having its plane perpendicular to the central axis. The surfaces have their maximum separation along the central axis and their minimum separation adjacent the periphery of the surfaces. There is a plurality of surfaces interconnecting the first and second surfaces, each of the interconnecting surfaces being everywhere substantially parallel to the central axis and defining an orifice through which some of the extrudate is forced. Because of the orientation of the surfaces, the orifices near the center of the plate are longer than those nearer the periphery to compensate for the frictional drag exerted on the outer portion of the extrudate by the surface of the die.

The extrudate is then forced through the improved breaker plate thereby forming a plurality of individual extrusions which, on the downstream side of the breaker plate, are permitted to nest together, again forming a generally cylindrical extrudate, which is cut into flat circular preforms as it leaves the die. The major advantage of the present invention is that the use of the novel breaker plate causes the extrusion material to flow at approximately the same speed everywhere in the die, thus making it possible to cut preforms which are flat rather than concave.

These and other objects and advantages of the present invention will become apparent to those skilled in the art upon a reading of the following detailed description and upon reference to the drawings in which:

DESCRIPTION OF THE PREFERRED EMBODIMENT

Figure 1:
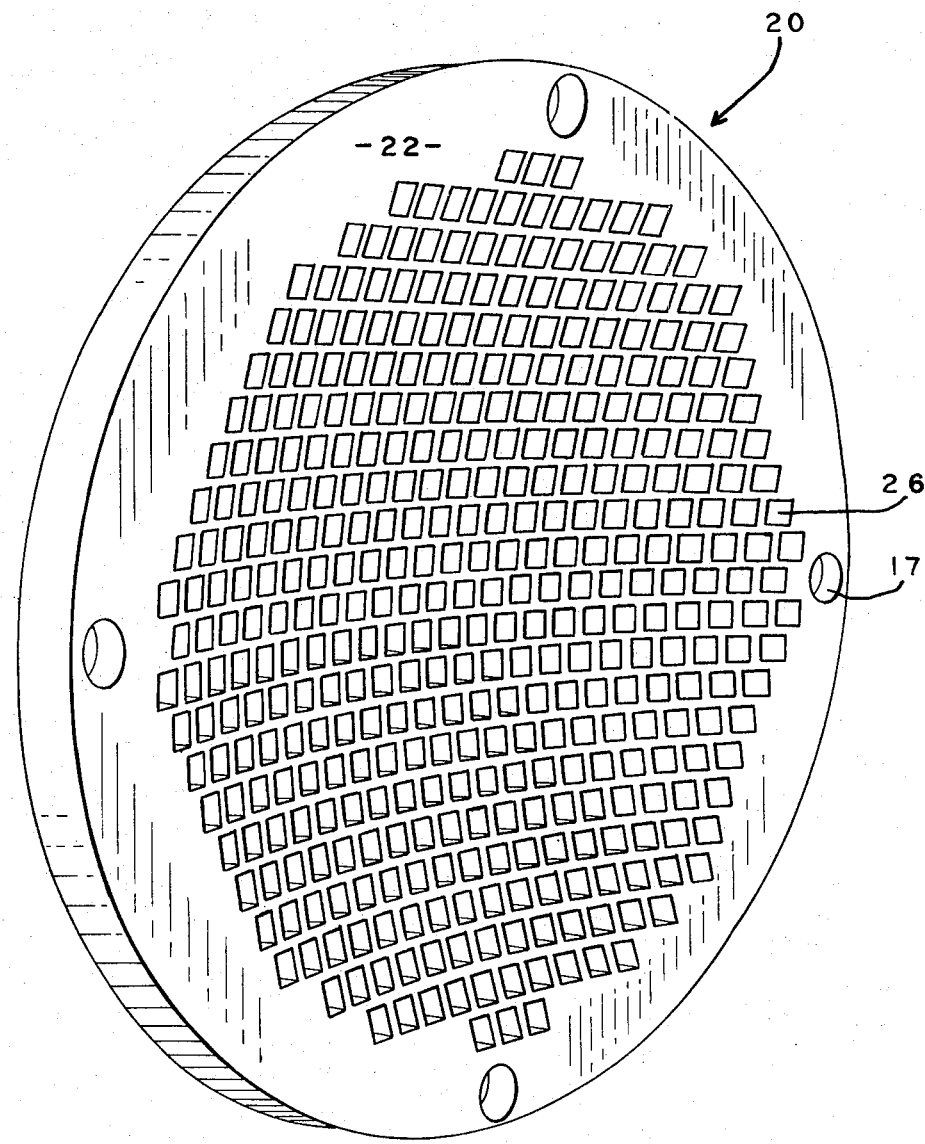
FIG. 1 is a perspective of the breaker plate of the present invention.
Figure 2:
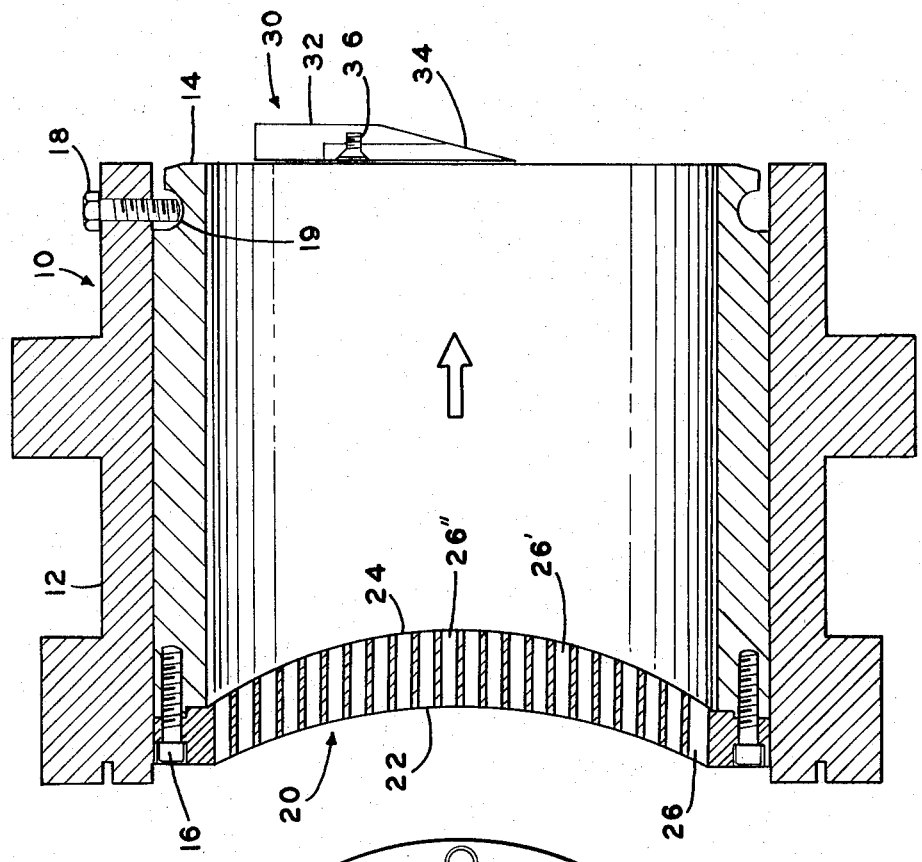
FIG. 2 is a cross section of an extruder head assembly utilizing the present invention.
Figure 3:
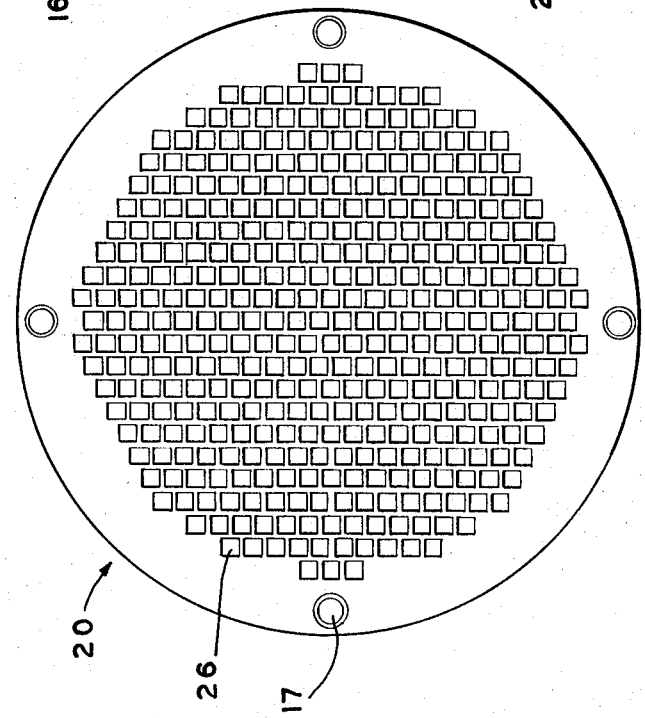
FIG. 3 is a front elevation of the breaker plate of the present invention taken on line 3—3 of FIG. 2.

Referring specifically to the drawings which are only for the purpose of illustrating the preferred embodiments of the present invention and not for the purpose of limiting the same, FIG. 2 is a cross section showing only the portion of the preform extruder involved in the method of the present invention. The extruder assembly 10 includes the extruder head 12, a cylindrical die 14 and the improved breaker plate 20 attached to the die by means of socket head set screws 16, within holes 17 of the breaker plate 20. The die and breaker plate assembly is retained within the extruder head by means of three bolts 18 located 120° apart around the extruder assembly and seated in a semi-circular groove 19. Cutting means 30 is illustrated in its cutting position, flush against the coplanar ends of extruder head 12 and die 14. The cutting means 30 includes a support blade 32 and cutting blade 34 inserted on support blade 32 and fastened by means of a series of countersunk flat-head metal screws 36.

As can best be seen in FIG. 2 breaker plate 20 has a first surface 22 which is concave and a second surface 24 which is convex. Both surfaces have their centers of curvature located upstream from the breaker plate (note the arrow indicating the direction of flow of material). Surface 22 is illustrated as having a longer radius of curvature than surface 24, with the result that the plate 20 is thicker near the center than at the periphery. The breaker plate 20 further includes a plurality of square orifices 26 extending through the plate and arranged, in the subject embodiment, in a series of parallel columns which are vertically off-set from each other, so that the adjacent square holes are in a staggered pattern. Each of the orifices 26 comprises four flat surfaces, and as a result of the configuration of the opposite surfaces 22 and 24, the orifices 26 are of various lengths, becoming gradually longer going from the periphery toward the center of the plate, as is illustrated by the orifices of FIG. 2 labeled respectively as 26, 26' and 26". It should be noted that within the spirit of the present invention, the hole pattern may vary from that described herein.

The breaker plate of the present invention can be made of any of the materials commonly used for breaker plates having the conventional configuration, but it is preferably made of heat treated steel. The manufacturing process by which the breaker plate is given its particular configuration can be any of the frequently-used metal fabricating techniques, such as die casting, but the breaker plate is preferably milled to its concave shape and the square holes then formed by means of a specially shaped grid and an electrolysis discharge machine. The holes 26, shown as square, could be of any other configuration such as round, rectangular, rhomboidal or triangular, but in the preferred embodiment they are illustrated as square so that after the individual extrusions pass through the breaker plate, they can easily nest together with each surface of each one in contact with a surface of an adjacent extrusion. This nesting arrangement enables the extrudate to more easily regain its overall cylindrical shape and permits the individual extrusions to fuse together.

In the subject embodiment, if, as an example, it is desired to make a preform approximately 8 ¾ inches in diameter, the die should be approximately 7 ⅛ inches on the inside diameter and about 8 inches long, so that most of the natural expansion of the extrudate as it emerges from the breaker plate will occur within the die, thus minimizing the distortion of the preform after it passes the end of the die and is severed, by the cutting blade, from the cylindrical extrudate. The individual orifices in the preferred embodiment are approximately one-fourth of an inch square and vary in length from about three-fourths of an inch around the periphery of the plate to about 1 inch at the center of the plate. While these dimensions of the plate can vary depending upon the size of the desired preform, it has been found in making the preform of the above example that this particular variation in the thickness of the plate, from the periphery to the center, is optimum to compensate for the drag exerted on the extrudate by the inside surface of the extruder die. The result is that the material near the center is slowed down by the longer orifices near the center of the plate to a speed approximately equal to the speed of flow of the material near the periphery. As can be readily appreciated, at a distance midway between the center of the periphery where the orifices are shorter than at the center, the frictional drag exerted by the walls is also less, and the speed of flow is about the same as at the center and the periphery.

Figure 4:
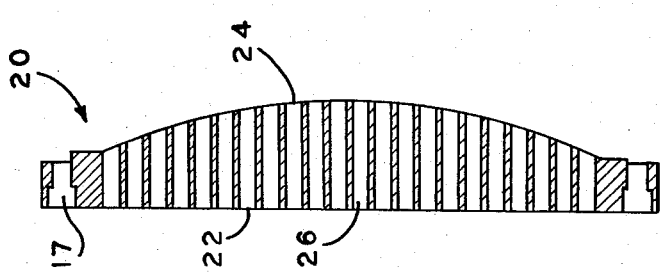
FIG. 4 is a cross section similar to FIG. 2, showing an alternative embodiment of only the breaker plate of the present invention.

FIG. 4 is an alternative embodiment of the breaker plate of the present invention wherein the surface on plate of the present invention wherein the surface on the upstream side of the plate is substantially flat and the opposite surface is convex. It is apparent that this alternative breaker plate configuration is within the spirit of the present invention since it performs the function of increasing the length of the orifices near the center of the plate, and the resulting frictional drag on the polymeric extrusion. As can be readily appreciated, the die could be other than circular, such as elliptical, and the breaker plate could also be elliptical, in which case the pattern of orifices could still be circular, or could also be elliptical.

Figure 6:
FIG. 6 is a cross section similar to FIG. 5 of the flat preform made in accordance with the present invention.
Figure 5:
FIG. 5 is a cross section of the concave extruder preform of the prior art.

FIGS. 5 and 6 illustrate the difference in the shape of the preform which results from the use of the present invention, FIG. 5 being the concave prep made with a conventional breaker plate and FIG. 6 the advantageous flat prep made with the improved breaker plate.

In the following examples of products, and their constituent materials, molded from preps made in accordance with the present invention, an average saving of $0.05 per prep was realized through a reduction in the amount of flash and scrap. These examples are intended only to further delineate the invention, and not to limit the scope of the appended claims.

EXAMPLE 1

A brake cup for a wheel cylinder, about 1 ⅝ inches in diameter, made from SBR, styrene-butadiene rubber:
carbon black
SBR
Zinc oxide
sulfur

EXAMPLE 2

A U-cup for a leveling valve, about 0.4 inches in diameter, made from Buna N, an acrylonitrile-butadiene copolymer:
carbon black
Buna N
zinc oxide
Plasticizer

EXAMPLE 3

A brake cup for a wheel cylinder, about 1 5/16 inches in diameter, made from EPDM, an ethylene-propylenediene terpolymer:

carbon black
EPDM
Zinc oxide
Petro plasticizer
Sulphur peroxide

In each of the foregoing examples, the barrel temperature of the compound was between about 70°C. and about 90°C. depending upon the scorch factor of the particular material.

It will be understood by those familiar with the art that many modifications and alternatives can be made in the apparatus and method of the present invention. Accordingly, it is intended that the foregoing specification embrace all such alternatives and modifications as fall within the spirit of the appended claims.

What is claimed is:

1. In a method of making a generally flat circular transfer preform from a polymeric extrudate, including forcing the elastomeric material through a breaker plate, then through an extruder die defining a longitudinal axis, and cutting said extrudate into said preforms, the improvement comprising:

a. providing an improved breaker plate having first and second oppositely disposed surfaces, each of said surfaces generally defining a portion of a sphere, a center of curvature and a radius of curvature, said centers of curvature are both located on the upstream side of said breaker plate, said first radius of curvature is slightly longer than said second radius of curvature, said plate defines a plurality of orifices extending through said plate and covering a major portion of the surface area of said plate, said orifices have cross-sections which are substantially parallelograms and each comprises four surfaces oriented substantially parallel to said longitudinal axis, said orifices nearer the center of said plate are longer than those nearer the periphery, to compensate for the frictional drag exerted on the extrudate by the surface of said barrel;

b. forcing said extrudate through said improved breaker plate thereby forming a plurality of individual extrusions having cross-sections which are parallelograms; and c. permitting said individual extrusions to nest together downstream from said breaker plate, in a generally cylindrical configuration.

2. The method of claim 1 including the further step of cutting said generally circular extrudate into transfer preforms having minimal tendency for their surfaces perpendicular to said longitudinal axis to be concave.

* * * * *

PO-1050 (5/69)

UNITED STATES PATENT OFFICE
CERTIFICATE OF CORRECTION

Patent No. 3,863,001　　　　　Dated January 28, 1975

Inventor(s) Mario F. Thumudo, Jr.

It is certified that error appears in the above-identified patent and that said Letters Patent are hereby corrected as shown below:

Page 1, please add after the inventor's name and address:

"Assignee　The General Tire & Rubber Company
　　　　　　Akron, Ohio"

Signed and sealed this 15th day of April 1975.

(SEAL)
Attest:

RUTH C. MASON
Attesting Officer

C. MARSHALL DANN
Commissioner of Patents
and Trademarks